(12) United States Patent
Norikane et al.

(10) Patent No.: US 10,854,113 B2
(45) Date of Patent: Dec. 1, 2020

(54) SOLID FREEFORM FABRICATION OBJECT, INTERNAL ORGAN MODEL, AND METHOD OF MANUFACTURING THE SAME

(71) Applicants: Yoshihiro Norikane, Kanagawa (JP); Tatsuya Niimi, Kanagawa (JP); Takashi Matsumura, Kanagawa (JP); Hiroshi Iwata, Tokyo (JP); Hiroyuki Naito, Tokyo (JP)

(72) Inventors: Yoshihiro Norikane, Kanagawa (JP); Tatsuya Niimi, Kanagawa (JP); Takashi Matsumura, Kanagawa (JP); Hiroshi Iwata, Tokyo (JP); Hiroyuki Naito, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 525 days.

(21) Appl. No.: 15/450,720

(22) Filed: Mar. 6, 2017

(65) Prior Publication Data
US 2017/0270831 A1    Sep. 21, 2017

(30) Foreign Application Priority Data

Mar. 17, 2016 (JP) ................................. 2016-054445

(51) Int. Cl.
*G09B 23/30* (2006.01)
*B29C 64/20* (2017.01)
*B33Y 70/00* (2020.01)
*B29C 64/112* (2017.01)
*B33Y 10/00* (2015.01)
*B33Y 30/00* (2015.01)
(Continued)

(52) U.S. Cl.
CPC ............ *G09B 23/30* (2013.01); *B29C 64/112* (2017.08); *B29C 64/20* (2017.08); *B33Y 10/00* (2014.12); *B33Y 30/00* (2014.12); *B33Y 70/00* (2014.12); *B33Y 80/00* (2014.12); *B29K 2105/0032* (2013.01); *B29K 2105/0061* (2013.01); *B29K 2995/002* (2013.01); *B29L 2031/40* (2013.01); *B29L 2031/7532* (2013.01)

(58) Field of Classification Search
CPC ...................................................... G09B 23/30
USPC ......................................................... 434/272
See application file for complete search history.

(56) References Cited

U.S. PATENT DOCUMENTS 4,734,237 A * 3/1988 Fanelli ...................... B22F 3/22
                                                         264/109
4,883,660 A * 11/1989 Blackman ............ A61K 9/0014
                                                          514/171

(Continued)

FOREIGN PATENT DOCUMENTS

JP        11-349870           12/1999
JP     2002-521249 A          7/2002
(Continued)

OTHER PUBLICATIONS

Extended European Search Report dated Jul. 19, 2017 in Patent Application No. 17158486.5.
(Continued)

*Primary Examiner* — John E Simms, Jr.
*Assistant Examiner* — Dolores R Collins
(74) *Attorney, Agent, or Firm* — Oblon, McClelland, Maier & Neustadt, L.L.P.

(57) ABSTRACT

A solid freeform fabrication object includes a hydrogel including a polymer, water, and a coloring material inclusion substance.

12 Claims, 4 Drawing Sheets

(51) Int. Cl.
  *B33Y 80/00*  (2015.01)
  *B29L 31/00*  (2006.01)
  *B29K 105/00*  (2006.01)
  *B29L 31/40*  (2006.01)

(56) References Cited

U.S. PATENT DOCUMENTS

| | | | | |
|---|---|---|---|---|
| 6,066,219 | A * | 5/2000 | Schulz-Harder | C04B 37/025 |
| | | | | 156/307.1 |
| 6,129,872 | A * | 10/2000 | Jang | B29C 41/36 |
| | | | | 264/245 |
| 6,139,574 | A * | 10/2000 | Vacanti | A61F 2/022 |
| | | | | 600/36 |
| 6,165,406 | A * | 12/2000 | Jang | G05B 19/4099 |
| | | | | 264/308 |
| 6,316,153 | B1 * | 11/2001 | Goodman | A61K 9/0097 |
| | | | | 430/8 |
| 6,401,002 | B1 * | 6/2002 | Jang | G05B 19/4099 |
| | | | | 204/192.15 |
| 6,454,972 | B1 * | 9/2002 | Morisette | B29B 7/401 |
| | | | | 264/39 |
| 6,656,410 | B2 * | 12/2003 | Hull | B29C 41/12 |
| | | | | 264/113 |
| 6,713,125 | B1 * | 3/2004 | Sherwood | B29C 71/0009 |
| | | | | 427/157 |
| 7,168,935 | B1 * | 1/2007 | Taminger | B23K 15/0073 |
| | | | | 219/121.12 |
| 7,780,897 | B2 | 8/2010 | Wicker et al. | |
| 7,993,140 | B2 * | 8/2011 | Sakezles | G09B 23/306 |
| | | | | 434/267 |
| 9,168,573 | B2 * | 10/2015 | Hojaji | C09D 7/61 |
| 10,173,357 | B2 * | 1/2019 | Rutz | A61L 27/18 |
| 10,176,642 | B2 * | 1/2019 | Tran | G06T 19/006 |
| 2006/0237880 | A1 | 10/2006 | Wicker et al. | |
| 2011/0024936 | A1 * | 2/2011 | Collins | B29C 64/165 |
| | | | | 264/78 |
| 2011/0059292 | A1 | 3/2011 | Wicker et al. | |
| 2011/0212501 | A1 * | 9/2011 | Yoo | A61L 27/54 |
| | | | | 435/174 |
| 2012/0308805 | A1 * | 12/2012 | Sella | B29C 31/10 |
| | | | | 428/222 |
| 2014/0299015 | A1 | 10/2014 | Ichikawa | |
| 2016/0115297 | A1 * | 4/2016 | Norikane | C08K 5/41 |
| | | | | 428/218 |
| 2016/0275818 | A1 * | 9/2016 | Norikane | C08K 3/34 |
| 2017/0008228 | A1 | 1/2017 | Iwata et al. | |
| 2017/0022348 | A1 * | 1/2017 | Iwata | B33Y 70/00 |
| 2017/0225404 | A1 * | 8/2017 | Naruse | B29C 67/0092 |
| 2018/0039291 | A1 * | 2/2018 | Hess | F15B 13/024 |
| 2018/0061279 | A1 * | 3/2018 | Niimi | G09B 23/285 |

FOREIGN PATENT DOCUMENTS

| | | |
|---|---|---|
| JP | 2011-076035 | 4/2011 |
| JP | 2015-136895 | 7/2015 |
| JP | 2015-138192 | 7/2015 |
| JP | 2016-006477 | 1/2016 |
| JP | 2016-038563 | 3/2016 |
| WO | WO 2015/111366 A1 | 7/2015 |

OTHER PUBLICATIONS

U.S. Appl. No. 15/113,609, filed Jul. 22, 2016.
Japanese Office Action dated Jan. 7, 2020, in Patent Application No. 2016-054445, 2 pages.

* cited by examiner

SOLID FREEFORM FABRICATION OBJECT, INTERNAL ORGAN MODEL, AND METHOD OF MANUFACTURING THE SAME

CROSS-REFERENCE TO RELATED APPLICATIONS

This patent application is based on and claims priority pursuant to 35 U.S.C. § 119 to Japanese Patent Application No. 2016-054445, filed on Mar. 17, 2016, in the Japan Patent Office, the entire disclosure of which is hereby incorporated by reference herein.

BACKGROUND

Technical Field

The present invention relates to a solid freeform fabrication object, an internal organ model, and a method of manufacturing the solid freeform fabrication object.

Description of the Related Art

Internal organ models manufactured of silicone, a urethane elastomer, a styrene elastomer, etc. have been used for procedures for surgical operations.

Surgeons and support staff members are required to have procedure levels above certain levels to improve postoperative recovery and quality of life (QOL) of patients.

For this reason, internal organ models closer to real human internal organs are required having textures, internal structures, and usability of surgical devices such as an ultrasonic knife and an electrosurgical knife.

As the internal organ model to represent textures of human internal organs, molding materials for internal organ model including polyvinyl alcohol as the main component have been proposed.

In addition, internal organ models have been proposed which use a material liquidized due to heat of a heat generating device such as an electrosurgical knife when cut open by the heat generating device to ooze artificial blood.

SUMMARY

According to the present invention, provided is an improved solid freeform fabrication object includes a hydrogel including a polymer, water, and a coloring material inclusion substance.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DESCRIPTION OF THE EMBODIMENTS

Figure 1A:
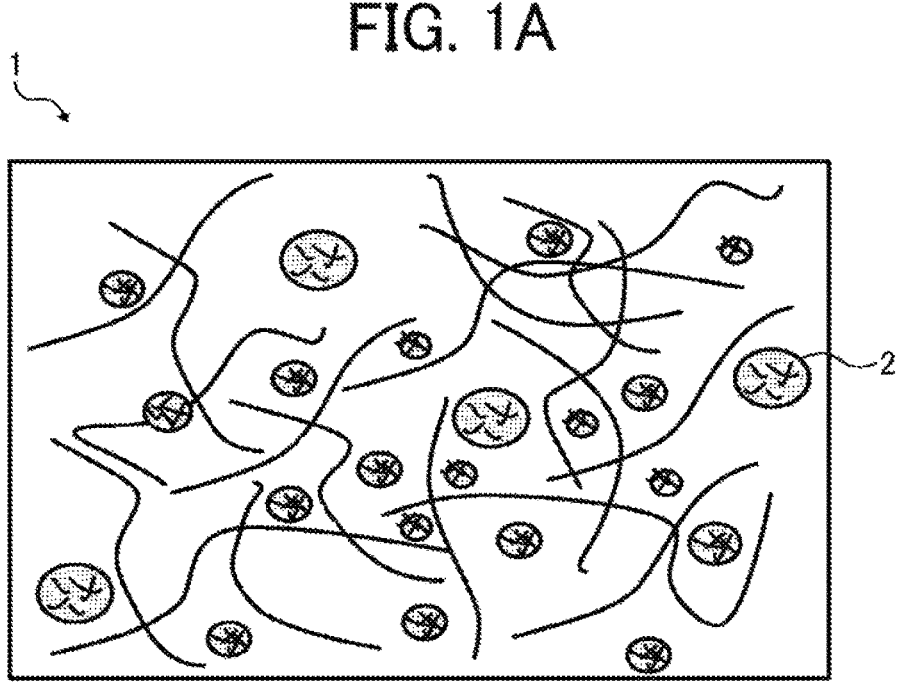
FIG. 1A is a schematic diagram illustrating an example of an internal organ model relating to an embodiment of the present disclosure.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc in the present disclosure represent the same meaning, unless otherwise specified.

Solid Freeform Fabrication Object (Three-Dimensional Object)

The solid freeform fabrication object of the present disclosure includes a hydrogel including a polymer, water, and a coloring material inclusion substance. The solid freeform fabrication object may optionally furthermore include other components.

The solid freeform fabrication object of the present disclosure is provided based on the knowing that internal organ models manufactured using typical modeling materials for internal organ model are relatively hard in comparison with real internal organs and blood vessels and internal structures (inclusion) of malady are not true to life. In addition, the solid freeform fabrication object of the present disclosure is provided based on the knowing that since artificial blood is eluted from a typical internal organ model due to heat of a heat generating device so that the artificial blood does not ooze when the internal organ model is cut open by a surgical knife. That is, the effect of the typical internal organ model is limited because it depends on a heat-generating device.

The solid freeform fabrication object preferably includes a hydrogel including multiple hydrogels having different compression stresses and at least one of the multiple hydrogels include the coloring material inclusion substance.

Hygrogel

The hydrogel includes a polymer, water, and a coloring material inclusion substance. The hydrogel preferably includes a mineral and may optionally furthermore include other components. The hydrogel is preferably a gel enclosing water inside the network structure of the polymer.

As the hydrogel, an organic-inorganic complex hydrogel formed of the polymer and the mineral is preferable.

The organic-inorganic complex hydrogel preferably has a rubber hardness of 6 to 60 and more preferably 8 to 20.

When the rubber hardness is 6 or greater, shape-losing during fabrication can be prevented. When the rubber hardness is 60 or less, it is possible to prevent cracking of an object during peeling after fabrication.

Rubber hardness can be measured by a durometer (GS-718N, manufactured by TECLOCK Corporation).

Polymer

There is no specific limit to the polymer and a suitable polymer is selected to suit to a particular application. For example, water-soluble polymers are preferable because the hydrogel includes water as the main component. Due to the water-soluble polymer, it is possible to maintain the strength of a hydrogel containing water as the main component.

Water-solubility of the water-soluble polymer is that, for example, when 1 g of the water-soluble polymer is mixed with 100 g of water and stirred at 30 degrees C., 90 percent by mass or more of the polymer is dissolved in water.

As the polymer, polymers having, for example, an amide group, an amino group, a hydroxyl group, a tetramethyl ammonium group, a silanol group, an epoxy group, etc. are suitable.

Homopolymer (monopolymer) and heteropolymers (co-polymers) can be the polymer. These can be modified. Also, known functional groups can be introduced into these. In addition, forms of salts are allowed.

There is no specific limitation to the proportion of the polymer and it can be suitably selected to suit to a particular application. It is preferably 0.5-20 percent by mass to the total content of a solid freeform fabrication object.

Coloring Material Inclusion Substance

The coloring material inclusion substance includes at least one coloring material and other optional components.

The coloring material inclusion substance can be included in at least a part of the hydrogel. It can be suitably selected to suit to a particular application.

There is no specific limitation to the coloring material inclusion substance and it can be suitably selected to suit to a particular application. For example, oil phase and microcapsule are suitable. These can be used alone or in combination.

When the coloring material inclusion substance includes at least one coloring material, a hydrogel containing water as the main component is prevented from being mixed with the coloring material during manufacturing of a solid freeform fabrication object so that a solid freeform fabrication object having a desired internal structure can be manufactured.

The volume average particle diameter of the coloring material inclusion substance has no particular limit and can be suitably selected to suit to a particular application. For example, the coloring material inclusion substance preferably has a volume average particle diameter of 1 mm or less and more preferably from 1.0 to 500 µm. The volume average particle diameter of the coloring material inclusion substance has no particular limit and can be measured by a known particle size measuring device to suit to a particular application.

Coloring Material

The coloring material is contained inside the coloring material inclusion substance. Body fluid such as blood can be artificially represented in a solid freeform fabrication object by using the coloring material.

There is no specific limitation to the coloring material. For example, dyes and pigments are selected to suit to a particular application. Oil-soluble dyes and oil-dispersible pigments are preferable.

Specific examples of the coloring material include, but are not limited to, carbon black, Nigrosine dyes, black iron oxide, Naphthol Yellow S, Hansa Yellow (10G, 5G and G), Cadmium Yellow, yellow iron oxide, loess, chrome yellow, Titan Yellow, polyazo yellow, Oil Yellow, Hansa Yellow (GR, A, RN and R), Pigment Yellow L, Benzidine Yellow (G and GR), Permanent Yellow (NCG), Vulcan Fast Yellow (5G and R), Tartrazine Lake, Quinoline Yellow Lake, Anthrazane Yellow BGL, isoindolinone yellow, red iron oxide, red lead, orange lead, cadmium red, cadmium mercury red, antimony orange, Permanent Red 4R, Para Red, Fire Red, p-chloro-o-nitroaniline red, Lithol Fast Scarlet G, Brilliant Fast Scarlet, Brilliant Carmine BS, Permanent Red (F2R, F4R, FRL, FRLL and F4RH), Fast Scarlet VD, Vulcan Fast Rubine B, Brilliant Scarlet G, Lithol Rubine GX, Permanent Red F5R, Brilliant Carmine 6B, Pigment Scarlet 3B, Bordeaux 5B, Toluidine Maroon, Permanent Bordeaux F2K, Helio Bordeaux BL, Bordeaux 10B, BON Maroon Light, BON Maroon Medium, Eosin Lake, Rhodamine Lake B, Rhodamine Lake Y, Alizarin Lake, Thioindigo Red B, Thioindigo Maroon, Oil Red, Quinacridone Red, Pyrazolone Red, polyazo red, Chrome Vermilion, Benzidine Orange, perynone orange, Oil Orange, cobalt blue, cerulean blue, Alkali Blue Lake, Peacock Blue Lake, Victoria Blue Lake, metal-free Phthalocyanine Blue, Phthalocyanine Blue, Fast Sky Blue, Indanthrene Blue (RS and BC), Indigo, ultramarine, Prussian blue, Anthraquinone Blue, Fast Violet B, Methyl Violet Lake, cobalt violet, manganese violet, dioxane violet, Anthraquinone Violet, Chrome Green, zinc green, chromium oxide, viridian, emerald green, Pigment Green B, Naphthol Green B, Green Gold, Acid Green Lake, Malachite Green Lake, Phthalocyanine Green, Anthraquinone Green, titanium oxide, zinc oxide, lithopone, and mixtures thereof. These can be used alone or in combination.

Oil-soluble dyes are available on the market. Specific examples include, but are not limited to, Sol.Red 18, Sol. Red 23, Sol.Red 24, Sol.Red 27, Sol.Red 49, Sol.Red 3, Sol.Yellow 33, Sol.Yellow 93, Sol.Yellow 56, Sol.Yellow 16, Sol.Yellow 14, Sol.Black 7, Sol.Black 3, Sol.Blue 70, Sol.Blue 35, Sol.Blue 94, Sol.Blue 5, and Sol.Violet 8 (all manufactured by Chuo synthetic Chemical Co., Ltd.), elixa Blue 648, elixa Yellow 129, elixa Red 348, elixa Green 502, elixa 540, and elixa Black803 (all manufactured by Orient Chemical Industries Co., Ltd.). These can be used alone or in combination.

The proportion of the coloring material is preferably 0.5-10 percent by mass and more preferably 1-5 percent by mass to the total content of the coloring material inclusion substance. When the proportion is in the range of from 0.5-10 percent by mass, real sensation is imparted when used for surgery training.

Oil Phase

There is no specific limitation to the oil phase and it can be suitably selected to suit to a particular application. It is preferable that the oil phase be dispersed in a solid freeform fabrication object as oil droplets.

It is preferable that the oil droplet be formed of an oil phase not easily soluble in water and include the coloring material mentioned above and optionally a surfactant in terms of stability of the oil droplet.

Oil Phase Solvent

There is no specific limit to the oil phase solvent and a suitable oil phase solvent is selected to a particular application. For example, oil and an organic solvent having a water solubility of 10 g/L or less are preferable.

There is no specific limitation to the oil and it can be suitably selected to suit to a particular application. A specific example is natural oil which is liquid at room temperature and has an unsaturated aliphatic acid as the main component. These can be used alone or in combination.

There is no specific limitation to the natural oil and it can be suitably selected to suit to a particular application. Specific examples include, but are not limited to, castor oil, salad oil, soybean oil, palm oil, and jojoba oil.

The organic solvent has no specific limit and is suitably selected to suit to a particular application. For example, synthetic solvents are usable.

Specific examples of the synthetic solvent include, but are not limited to, isoparaffin-based solvents such as Isopar™ C, Isopar™ E, Isopar™ G, Isopar™ H, Isopar™ L, Isopar™ M, Isopar™ V, Solvesso™ 100, Solvesso™ 150, Solvesso™ 200, Exxsol™ 100/140, Exxsol™ D30, Exxsol™ D40, Exxsol™ D80, Exxsol™ D110, and Exxsol™ D130 (all manufactured by Exxon Mobil Corporation), and silicone-based solvents such as KF96, 1-10,000 cst or greater (manufactured by Shin-Etsu Chemical Co., Ltd.), SH200, SH344 (manufactured by Dow Corning Toray Co., Ltd.), and TSF451 (manufactured by Momentive Performance Materials Inc.).

Surfactant

Surfactants can stabilize the coloring material inclusion substance.

The surfactant is not particularly limited and can be suitably selected to suit to a particular application. In terms of dispersion stability, nonionic surfactants and anionic surfactants are preferable.

Microcapsule

The microcapsule includes the coloring material and other optional components.

There is no specific limitation to the microcapsule and it can be suitably selected to suit to a particular application. For examples, articles prepared by in-situ method, interfacial polymerization method, coacervation method, etc.

There is no specific limitation to the microcapsule. Wall material, size, etc. can be suitably selected to suit to a particular application.

Specific examples of the wall material of the microcapsule include, but are not limited to, polyurethane resins, polyurea, polyurea-polyurethane resins, urea-formaldehyde resins, melamine-formaldehyde resins, polyamide, polyester, polysulfone amide, polycarbonate, polysufinate, epoxy resins, acrylic acid esters, methacrylic acid esters, vinyl acetate, and gelatin. These can be used alone or in combination. Of these, polyurethane resins are preferable.

The size of the microcapsule is not particularly limited and can be suitably selected to suit to a particular application. For example, the size is preferably from 1.0 to 500 μm and more preferably from 2.0 to 100 μm.

Mineral

There is no specific limitation to the mineral and it can be suitably selected to suit to a particular application. For example, since the main component of the hydrogel is water, laminate clay minerals uniformly dispersible in water at the level of primary crystal are preferable and water swellable clay minerals are more preferable.

Such water swellable clay mineral have no particular limit and can be suitably selected to suit to a particular application. Examples of such water swellable clay mineral are water swellable smectite and water swellable mica. These can be used alone or in combination. Of these, water swellable hectorite containing sodium as an interlayer ion, water swellable montmorillonite, water swellable saponite, and water swellable synthesized mica are preferable.

Also, as the mineral, these can be appropriately synthesized or available on the market.

The product available on the market are not particularly limited and can be suitably selected to suit to a particular application.

Specific examples include, but are not limited to, synthesized hectorite (laponite XLG, manufactured by Rock-Wood), SWN (manufactured by Coop Chemical Ltd.), and fluorinated hectorite SWF (manufactured Coop Chemical Ltd.). These can be used alone or in combination.

The proportion of the mineral is preferably from 1 to 40 percent by mass to the total content of a solid freeform fabrication object. When the proportion is from 1 to 40 percent by mass, the strength of the solid freeform fabrication object can be closer to that of a human internal organ.

The 80 percent compressive stress-strain of the solid freeform fabrication object is not particularly limited and can be suitably selected to suit to a particular application. The 80 percent compressive stress-strain is preferably from 0.01 to 5.0 MPa, more preferably from 0.1 to 3.0 MPa, and furthermore preferably from 0.5 to 2.0 MPa.

When the 80 percent compressive stress-strain is 0.01 MPa or greater, shape-losing is prevented during fabrication. When the 80 percent compressive stress-strain is 5.0 MPa or less, cracking after fabrication is prevented. The 80 percent compressive stress-strain can be measured by, for example, a universal tester (AG-I, manufactured by Shimadzu Corporation).

The 80 percent compressive stress-strain of the hydrogel is not particularly limited and can be suitably selected to suit to a particular application. The 80 percent compressive stress-strain is preferably from 0.01 to 5.0 MPa, more preferably from 0.1 to 3.0 MPa, and furthermore preferably from 0.5 to 2.0 MPa.

As the solid freeform fabrication object, in particular, when used as an internal organ model, it is possible to change the proportion between the polymer and the mineral to be able to truly reproduce internal organ information such as suitable hardness, viscoelasticity, and color. That is, since an organic-inorganic complex hydrogel enclosing water is included in a three-dimensional network structure of complex of the polymer and the mineral, the mechanical strength is maintained and elasticity can be equivalent to that of a real internal organ.

Moreover, expansibility of the organic-inorganic complex hydrogel can be improved. Furthermore, the texture is equal to that of an internal organ and the bite of a surgical scalpel (knife) into the hydrogel is extremely close to that of a desired real internal organ.

Water

As the water, deionized water, ultrafiltered water, reverse osmosis water, pure water such as distilled water, and ultra pure water can be used.

It is suitable to dissolve or disperse other components such as organic solvents in the water mentioned above to impart antibiotic property and electroconductive property and adjust hardness.

The proportion of the water is preferably from 10 to 99 percent by mass, more preferably 50-98 percent by mass, and furthermore preferably 60-97 percent by mass to the total content of a solid freeform fabrication object.

In addition, the hydrogel of the solid freeform fabrication object of the present disclosure can be suitably used as insole of a shoe and a grip for slip prevention.

Internal Organ Model

The internal organ model of the present disclosure includes the solid freeform fabrication object of the present disclosure and has the coloring material inclusion substance disposed at blood vessel sites. Therefore, when the blood vessel in the internal organ model is cut open by a knife or an electrosurgical knife, the coloring material oozes, reproducing oozing of body fluid, typically blood.

It is preferable that inclusion materials (internal structures) having different color or hardness be disposed at target positions when used as an internal organ model. For this reason, it is possible to use as a model to check the position into which a surgical knife is put before an operation.

The inclusion substance has no specific limit and is suitably selected to a particular application. Specific examples include, but are not limited to, mimics of blood vessels, tube, and malady, voids, and folds.

The internal organ model of the present disclosure has no particular limit and can reproduce every internal organ in a human body, including brain, heart, gullet, stomach, bladder, small intestine, large intestine, liver, kidney, spleen, pancreas, and womb.

In addition, the internal organ model of the present disclosure can truly reproduce inclusion structures such as blood vessels and malady, have textures and a bite of knife extremely close to those of desired internal organs, and can be cut open with a surgical knife. Therefore, for example, it is suitable as an internal organ model for doctors, trainee doctors, and medical students to practice procedures. Also, it can be used to check the bite of a manufactured surgical knife before shipment of the knife or a surgical operation.

Figure 1B:
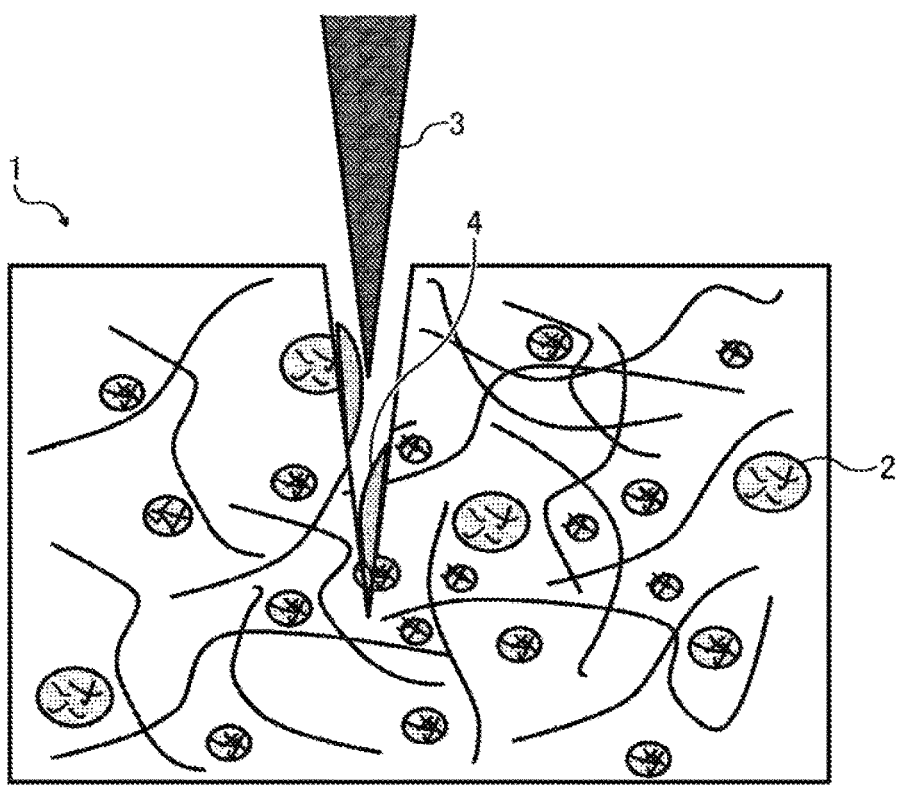
FIG. 1B is a schematic diagram illustrating the internal organ model illustrated in FIG. 1A when the internal organ model is cut open.

FIG. 1A is a schematic diagram illustrating an example of an internal organ model of the present disclosure. FIG. 1B is a schematic diagram illustrating the internal organ model illustrated in FIG. 1A when the internal organ model is cut open. As illustrated in FIG. 1A, an internal organ model 1 of the present disclosure includes an oil phase 2 including a coloring material 4. As illustrated in FIG. 1B, when the internal organ model is cut open by a surgical knife 3, etc., the oil phase 2 contained in the internal organ model 1 is severed. As a result, the coloring material 4 contained in the oil phase 2 oozes. Therefore, real sensation of a surgical operation can be reproduced in surgical operation training.

Figure 2:
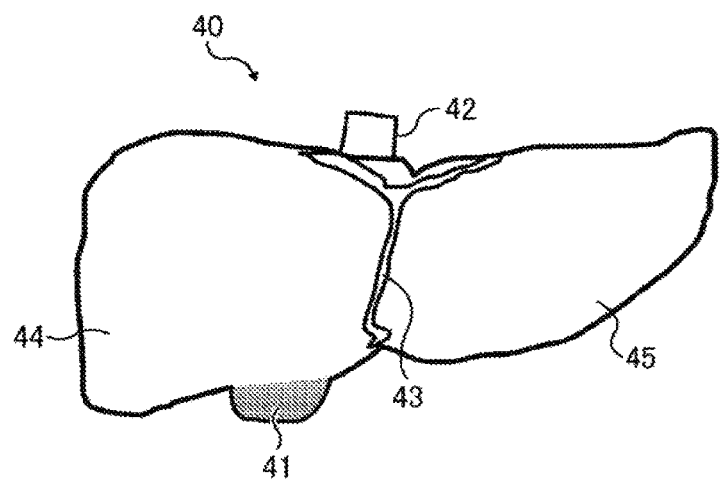
FIG. 2 is a schematic diagram illustrating an example of a liver model as an example of the internal organ model of the present disclosure.

Referring to FIG. 2, the internal organ model is described below. FIG. 2 is a schematic diagram illustrating an example of a liver model as an example of the internal organ model for a surgical procedure.

Livers are the largest internal organs located on the right side of the upper abdomen and below ribs. It weighs 1.2-1.5 kg in the case of an adult human. Livers change nutrition taken from food into a form a human body can utilize and control "metabolism" (store and supply), detox to detoxify harmful materials, and secretion of bile, which helps decomposition and absorption of fats, etc.

As illustrated in FIG. 2, a liver 40 is separated into a left lobe 45 and a right lobe 44 by a falciform ligament 43 linking a cholecyst 41 and an inferior vena cava 42.

Hepatectomy is an operation to cut out a part of the liver. Diseases to which hepatectomy is applied are, for example, cancer of liver (primary cancer of liver) in most cases, metastatic cancer of the liver, benign hepatic tumor, injury of the liver, etc.

Hepatectomy are classified into partial ablation, subsegmentectomy, segmental resection, lobectomy, extended lobectomy, and risegmentectomy depending on how to cut. These parts are not marked on a real liver. Therefore, in operation, surgeons tie up portals or hepatic artery passing through a target portion or infuse a pigment into a blood vessel to change the color thereof to render the border noticeable. Thereafter, the surgeon cuts the liver with various devices such as cautery (electrosurgical) knife, harmonic scalpel (ultrasonic vibration surgical instrument), CUSA (ultrasonic surgical aspirator), and MICROTAZE (microwave surgical instrument).

In such a case, the internal organ model of the present disclosure for procedure practice can be suitably used for operation simulations because the internal organ model can truly reproduce internal structures such as blood vessels and malady, has textures and bites of a knife extremely close to those of a target internal organ, and can be cut open by a surgical scalpel (knife).

Method of Manufacturing Solid Freeform Fabrication Object

According to the method of manufacturing a solid freeform fabrication object of the present disclosure, solid freeform fabrication objects including a hydrogel are manufactured using a hydrogel liquid precursor.

The method of manufacturing a solid freeform fabrication object including a hydrogel using the hydrogel liquid precursor includes, for example, a step of injecting the hydrogel liquid precursor into a mold to manufacture the solid freeform fabrication object (first embodiment) or a first step of applying the hydrogel liquid precursor to form a film, a second step of curing the formed film, and a step of repeating the first step and the second step multiple times (second embodiment).

The method of manufacturing a solid freeform fabrication object of the present disclosure can be suitably used to manufacture the solid freeform fabrication object of the present disclosure and the internal organ model of the present disclosure.

To manufacture the internal organ model, it is preferable to reproduce a complex shape based on the original 3D data. Also, the first embodiment and the second embodiment can be suitably used to have multiple portions having different properties.

Hydrogel Liquid Precursor

The hydrogel liquid precursor includes water, a monomer, a coloring material inclusion substance, and optionally mineral, a humectant, and other optional components.

Monomer

There is no specific limitation to the monomer and it can be suitably selected to suit to a particular application. The polymer can be obtained by polymerizing the monomer.

Examples of the monomer are acrylamide, N-substituted acrylamide derivative, N,N-di-substituted acrylamide derivative, N-substituted methacrylamide derivative, and N,N-di-substituted methacrylamide derivative. These can be used alone or in combination. Of these, acrylamide, N,N-dimethyl acrylamide, N-isopropylacrylamide, and PEG400# diacrylate are preferable.

The proportion of the monomer is preferably from 0.5 to 20 percent by mass to the total content of the hydrogel liquid precursor. When the proportion is from 0.5 to 20 percent by mass, the strength of the solid freeform fabrication object can be closer to that of a human internal organ.

Mineral

As the mineral, the same mineral as in the solid freeform fabrication object of the present disclosure can be used.

Coloring Material Inclusion Substance

As the coloring material inclusion substance, it is possible to use the same coloring material inclusion substance as those for the solid freeform fabrication object of the present disclosure.

Water

As the water, the same water as those for the solid freeform fabrication object of the present disclosure can be used.

Humectant

The humectant is not particularly limited and can be suitably selected to suit to a particular application.

Specific examples include, but are not limited to, alkyl alcohols having one to four carbon atoms such as methyl alcohol, ethyl alcohol, n-propyl alcohol, isopropyl alcohol, n-butyl alcohol, sec-butyl alcohol, and tert-butyl alcohol, amides such as dimethylfornamide and dimethylacetoamide, ketones or ketone alcohols such as acetone, methylethylketone, and diacetone alcohol, ethers such as tetrahydrofuran and dioxane, multi-valent polyols such as ethylene glycol, propylene glycol, 1,2-propane diol, 1,2-butanediol, 1,3-butanediol, 1,4-butanediol, diethylene glycol, triethylene glycol, 1,2,6-hexane triol, thioglycol, hexylene glycol, and glycerin, polyalkylene glycols such as polyethylene glycol and polypropylene glycol, lower alcohol ethers of polyols such as ethylene glycol monomethyl (or ethyl) ether, diethylene glycol methyl (or ethyl) ether, and triethylene glycol monomethyl (or ethyl) ether, alkanol amines such as monoethanol amine, diethanol amine, and triethanol amine, N-methyl-2-pyrolidone, 2-pyrolidone, and 1,3-dimethyl-2-imidazoline. These can be used alone or in combination. Of these, in terms of moisture retention, polyols are preferable and glycerin is more preferable.

As the humectant, hydrogel bulk or being present around the surface is preferable.

As the humectant, in the first embodiment and the second embodiment, it is preferable to conduct curing a hydrogel liquid precursor including a humectant.

In this case, the humectant is present all over a hydrogel bulk.

The proportion of the humectant is preferably from 10 to 50 percent by mass to the total content of the hydrogel liquid precursor. When the proportion is 10 percent by mass or greater, drying can be prevented. When the proportion is 50 percent by mass or less, mineral can be uniformly dispersed.

Other Components

The other optional components are not particularly limited and can be suitably selected to suit to a particular application. Examples are asepticus, coloring materials other than the coloring material contained in the coloring material inclusion substance, perfumes, antioxidants, polymerization initiators, and chelate agents.

The asepticus is not particularly limited and can be suitably selected to suit to a particular application. Specific example include, but are not limited to, dehydroacetate, sorbic acid salts, benzoic acid salts, sodium pentachlorophenol, sodium 2-pyridinethiol-1-oxide, 2,4-dimethyl-6-acetoxy-m-dioxane, and 1,2-benzthiazolin-3-on. These can be used alone or in combination.

The coloring material other than the coloring material contained in the coloring material inclusion substance has no particular limit and can be suitably selected to suit to a particular application. The same coloring material as those for use in coloring material inclusion substance of the solid freeform fabrication object of the present disclosure can be suitably used. Both can be the same or different.

If a coloring material is contained in the hydrogel liquid precursor, it is possible to color an obtained internal organ model close to the color of a human internal organ.

There is no specific limitation to the polymerization initiator and it can be suitably selected to suit to a particular application. Specific example include, but are not limited to, sodium peroxodisulfate and tetramethylethylene diamine. These can be used alone or in combination.

There is no specific limitation to the chelate agent and it can be suitably selected to suit to a particular application. A specific example is 1-hydroxyethane-1,1-diphosphonic acid.

The hardness of an internal organ model can be adjusted by, for example, changing the content of a mineral contained in the hydrogel liquid precursor.

The color can be adjusted by, for example, adding the coloring material mentioned above to the hydrogel liquid precursor.

There is no specific limitation to the surface tension of the hydrogel liquid precursor and it can be selected to suit to a particular application. For example, the surface tension is preferably 20-45 mN/m and more preferably 25-34 mN/m.

When the surface tension is 20 mN/m or greater, stability of discharging during fabrication is improved. When the surface tension is 45 mN/m or less, a discharging nozzle for fabrication (shape-forming) is easily filled with liquid.

Surface tension can be measured by a surface tensiometer (automatic contact angle DM-701, manufactured by Kyowa Interface Science Co., LTD.), etc.

Viscosity of the hydrogel liquid precursor has no particular limitation and can be suitably selected to suit to a particular application. The temperature can be adjusted. For example, viscosity is 3-20 mPa·s and more preferably 6-12 mPa·s at 25 degrees C.

When the viscosity is 3 mPa·s or greater, stability of discharging during fabrication is improved. When the surface tension is 20 mPa·s or less, discharging becomes easy.

Viscosity can be measured by, for example, a rotation viscometer (VISCOMATE VM-150 III, manufactured by TOKI SANGYO CO., LTD.) in a 25 degrees C. environment.

The hydrogel liquid precursor can be oil in water (O/W) emulsified by admixing an oil phase solvent in which a desired component (for example, coloring material inclusion substance) is dispersed or dissolved with a HOMOMIXER (HOMOMIXER MARK II, manufactured by PRIMIX Corporation).

The hydrogel liquid precursor in O/W emulsification can form a solid freeform fabrication object in which oil droplets are at least partially present by curing and holding the hydrogel liquid precursor according to the method of manufacturing a solid freeform fabrication object of the present disclosure.

First Embodiment

The first embodiment includes a step of injecting the hydrogel liquid precursor into a mold and other optional steps.

Mold

The mold has no particular limit as long as it is made of a material not affected by the hydrogel liquid precursor and can be suitably selected to suit to a particular application. In addition, since the hydrogel liquid precursor is present in liquid form, it is preferable to use a mold free of liquid spill.

The mold can be made using a mechanical polishing and cutting. For example, a known inkjet stereolithography (for example, 3D printer, AGILISTA, manufactured by KEYENCE CORPORATION) can be used to manufacture a mold.

The method of injecting the hydrogel liquid precursor into the mold is not particularly limited and can be selected to suit to a particular application. For example, a dispenser method, a spray method, or an inkjet method is suitable. Known devices are suitably used to execute these methods.

Inclusion substances such as blood vessels in the internal organ model are separately formed and can be disposed at a predetermined position in the mold.

When manufacturing the mold and the inclusion substance such as blood vessels, it is preferable to manufacture those from metal or resins with cutting, stereolithography, or a 3D printer based on 3D data.

Second Embodiment

The second embodiment includes the first step of applying the hydrogel liquid precursor to form a film, the second step of curing the film formed in the first step, repeating the first step and the second step, optionally a third step of forming a support, and other optional steps in order to laminate films based on 3D data.

As the film (layer) lamination (additive manufacturing) method based on 3D data, discharging a hydrogel liquid precursor by a material jet fabrication device using an inkjet method is preferable to form a solid freeform fabrication object with precision.

The sequence of conducting the first step, the second step, and the third step has no particular limit. For example, the third step may be conducted before or after the first step and the second step. Of these, in terms of forming a support first, it is preferable to conduct the third step before the first step and the second step.

As the hydrogel liquid precursor in the second embodiment, it is preferable to use two hydrogel liquid precursors of a first hydrogel liquid precursor including a coloring material inclusion substance including at least one coloring material and a second hydrogel liquid precursor including no coloring material inclusion substance including at least one coloring material. By using the two kinds of liquids, it is possible to separately manufacture a blood vessel portion and an internal organ portion in an internal organ model.

In the second embodiment of the method of manufacturing the solid freeform fabrication object, each of the steps described above is repeated. The number of the repetition is not simply determined because the number depends on the size, shape, structure, etc. of the 3D object to be manufactured. However, if the thickness per layer is in the range of from 10 to 50 μm, the object can be fabricated with precision free of peeling-off. Therefore, forming a layer is repeated until the thickness of the fabricated object reaches the height of the 3D object to be manufactured.

The device for manufacturing a solid freeform fabrication object includes an accommodating device to accommodate the hydrogel liquid precursor, an application device to apply the hydrogel liquid precursor, and an irradiator to emit ultraviolet and preferably a first device to apply the hydrogel liquid precursor to form a film and a second device to cure the film. The device also may optionally include other devices.

The accommodating device has no particular limit as long as it can accommodate the hydrogel liquid precursor and can be suitably selected to suit to a particular application.

The application device and the first device preferably use inkjet heads.

First Process and First Device

The first step applies the hydrogel liquid precursor to form a film and can be executed by the first device.

The first step and the first device to apply the hydrogel liquid precursor are not particularly limited as long as liquid droplets can be applied to a target site with a suitable precision. For example, a dispenser method, a spray method, an inkjet method, etc. can be suitably selected to a particularly application. Known devices are suitably used to execute these methods.

Of these, the dispenser method has an excellent quantitative property but the application area is small. The spray method is capable of simply forming a fine discharging material, has a wide application area, and demonstrates excellent applicability but the quantitative property thereof is poor so that powder material scatters due to the spray stream. For this reason, in the present disclosure, the inkjet method is particularly preferable. The inkjet method has a good quantitative property in comparison with the spray method and a wider application area in comparison with the dispenser method. Accordingly, the inkjet method is preferable to accurately and efficiently form a complex shape.

When utilizing the inkjet method, nozzles capable of discharging the hydrogel liquid precursor are provided. As the nozzle, nozzles for use in a known inkjet printer can be suitably used.

Second Process and Second Device

The second step cures the film formed in the first step and can be executed by the second device.

As the second device to cure the film, for example, an ultraviolet (UV) irradiating lamps, electron beam, etc. are used. The device to cure the film preferably includes a mechanism to remove ozone.

The ultraviolet irradiating lamp includes, for example, a high pressure mercury lamp and an ultra high pressure mercury lamp, a metal halide lamp, and an ultraviolet light-emitting diode (UV-LED).

The ultra-high pressure mercury lamp is a point light source but if the DeepUV type combined with an optical system to have a high light use efficiency is used, the lamp is capable of emitting light in a short-wavelength range.

Since the metal halide has a wide range of wavelength, it is suitable for colored materials. Halogenated materials of metal such as Pb, Sn, and Fe are used therefor and can be selected to absorption spectrum of a photopolymerization initiator. The lamp for use in curing has no particular limit and can be suitably selected to suit to a particular application. Lamps available on the market such as H lamp, D lamp, or V lamp, (manufactured by Fusion System) can be used.

There is no specific limitation to the emitting wavelength of the ultraviolet light-emitting diode and it can be suitably selected to suit to a particular application. In general, wavelengths of 365 nm, 375 nm, 385 nm, 395 nm, and 405 nm are used. Taking into account the impact on the color of a solid freeform fabrication object, short wavelength irradiation is advantageous to increase absorption of a polymerization initiator. Of these, since the solid freeform fabrication object of the present disclosure as a hydrogel easily affected by heat energy is used, it is preferable to use an ultraviolet light-emitting diode generating less heat as an ultraviolet (UV) irradiating lamp.

The film after being cured is preferably an organic-inorganic hydrogel which contains water and ingredients dissoluble in the water in a three-dimensional network structure formed by complexing a polymer and a mineral.

The organic-inorganic hydrogel has good expansibility and can be peeled off without breakage, so that treatment after fabrication is significantly simplified.

Third Process and Third Device

In the third step, a liquid for forming a support including at least a monomer is applied to a site different from that of the hydrogel liquid precursor to form a support. The third step can be executed by the third device.

"Site different from that of the hydrogel liquid precursor" means that the application position of the liquid for forming a support does not overlap the application position of the hydrogel liquid precursor. Both can be adjacent to each other.

The method of applying the liquid for forming a support and the device therefor can be respectively the same as those for applying the hydrogel liquid precursor and the device therefor.

Liquid for Forming Support

The liquid for forming a support includes at least a monomer and optionally a polymerization initiator, a coloring material, and other components. The liquid for forming a support is also referred to as "material for hard modeling object".

Monomer

The monomer is not particularly limited as long as it can be cured by irradiation of active energy ray, heat, etc. and can be suitably selected to suit to a particular application. For example, active energy ray curable compounds, active energy ray curable prepolymers, photocurable resins of emulsion type, and thermally-curable compounds are suitable. Of these, to prevent nozzle clogging, materials that are liquid at room temperature are suitable.

The proportion of the monomer is preferably from 60 to 100 percent by mass, more preferably 80 to 100 percent by mass, and furthermore preferably 90 to 100 percent by mass to the total content of a liquid for forming a support.

Polymerization Initiator

As the photopolymerization initiator, any material can be used which produces a radical upon irradiation of light (ultraviolet having in a wavelength range of 220-400 nm).

The surface tension of the liquid for forming a support can be the same as the surface tension of the hydrogel liquid precursor.

The viscosity of the liquid for forming a support can be the same as the viscosity of the hydrogel liquid precursor.

Fourth Step and Fourth Device (Smoothing Device)

The fourth step smoothes the film cured in the second step and can be executed by the fourth device.

There is no specific limitation to the selection of fourth device (smoothing device) and it can be suitably selected to suit to a particular application. Specific examples include, but are not limited to, rollers and blades.

Roller

As the roller, there is no specific limitation to size, structure, materials, etc. These can be suitably selected to suit to a particular application. For example, it may employ a solid or hollow cylinder form, a single-layer structure or a laminate structure. The size can be suitably determined according to the size of the solid freeform fabrication object, etc. The material is, for example, resin, rubber, metal, and combinations thereof.

As the roller, for example, rubber rollers including a cored bar and a rubber layer thereon, rubber rollers formed of only rubber without a cored bar, a foam roller including a cored bar and a foam layer formed on the peripheral of the core bar, and a metal roller are suitable.

Other Steps and Other Devices

There is no specific limitation to the other optional step and it can be suitably selected to suit to a particular application. Specific examples include, but are not limited to, a peeling-off step, a step of stabilizing discharging, a step of cleaning a fabrication object, and a step of polishing a fabrication object.

Peeling-Off Step and Peeling-Off Device

In the peeling-off step, the portion formed of a solid freeform fabrication object being a hydrogel including water formed of the hydrogel liquid precursor as the main component is peeled off from the portion formed of a polymer formed of the monomer and can be executed by a peeling-off device.

The peeling-off device has no specific limit and is suitably selected to suit to a particular application. For example, known peeling-off devices are usable.

Step of Stabilizing Discharging and Device for Stabilizing Discharging

When an inkjet head is used as the device to discharge liquid, nozzle drying during non-discharging is an issue for stable operation.

Therefore, if an inkjet head does not continuously discharge liquid for a long period of time, the step of stabilizing discharging and the device for stabilizing discharging execute with at least a member having a form to cover the distal end of the head, a step of covering (capping) the discharging hole (orifice) to prevent the head from being dried, a step of ejecting a film having a high viscosity or a dried film appearing due to drying of liquid inside around the orifice by suction, and/or a step of wiping off the orifice or the vicinity thereof, to keep the discharging state stable for a long period of time.

This is extremely suitable when fabricating a 3D object requiring continuous discharging for 24 hours or longer and when using a liquid including a low boiling point solvent such as water to fabricate a soft material in particular.

As described above, in the method of manufacturing a solid freeform fabrication object (3D object) of the present disclosure, the liquid is discharged through fine holes by an inkjet method or dispenser method so that the liquid is applied to form images layer by layer. Therefore, the site where the liquid for forming a support and the hydrogel liquid precursor are adjacent to each other is clearly separated and not mixed with each other (non-compatible state).

In the method of manufacturing a solid freeform fabrication object of the present disclosure, since the hydrogel liquid precursor and the liquid for forming a support are non-compatible with each other, the border therebetween after photocuring is clear. Furthermore, due to the difference of hardness between the thus-obtained 3D object and the support, the 3D object is easily separated (peeled-off) from the support. Therefore, the surface smoothness of the solid freeform fabrication is improved, so that the polishing step after fabrication can be significantly or completely omitted.

Another embodiment of the method of manufacturing a solid freeform fabrication object of the present disclosure and a specific embodiment of the device for manufacturing a solid freeform fabrication object are described.

Using the hydrogel liquid precursor (hereinafter also referred to as "material for soft modeling object") and a liquid for forming a support including a monomer (hereinafter referred to as "material for hard modeling object"), a solid freeform fabrication object being as a soft hydrogel can be obtained.

First, surface data or solid data (3D data) of three-dimensional form designed by three dimensional computer-aided design (CAD) or taken in by a three-dimensional scanner or a digitizer are converted into Standard Template Library (STL) format, which is thereafter input into a device for manufacturing a solid freeform fabrication object.

Based on the input data, the direction of the fabrication direction of three-dimensional form to be fabricated is determined.

The fabrication direction is not particularly limited. Normally, the direction is chosen such that the Z direction (height direction) is the lowest.

After determining the direction of the fabrication, the projected areas on X-Y plane, X-Z plane, and Y-Z plane of the three-dimensional form are obtained. To reinforce the thus-obtained block form, each plane except for the upper plane of the X-Y plane is transferred to the outside direction in a suitable amount. The transfer amount is not particularly limited and is, for example, about 1 mm to about 10 mm although depending on the form, the size, and the liquid material. The block form enclosing the form to be fabricated is identified except for the upper plane (the upper plane is open).

This block form is sliced in the Z direction with a thickness of a single layer. The thickness of a single layer varies depending on materials and cannot be simply determined. It is preferably from 10 to 50 µm.

When only one solid object is manufactured, this block form is placed in the center of the Z stage (i.e., table on which the fabricated object is placed, the fabricated object being lowered in an amount of a single layer every time a layer is fabricated). In addition, when a plural of three-dimensional objects are fabricated at the same time, the block forms are arranged on the Z stage. Alternatively, the block forms can be piled up. It is possible to automatically create the block forms, the sliced data (contour line data), and the placement on the Z stage if materials to be used are determined.

Next is the fabrication process. Referring to the outermost contour line of the slice data, the position on which the liquid material for soft modeling object is jetted and the position on which the liquid material for hard modeling object are controlled by inside-outside determination (which of the liquid material for soft modeling object and the liquid material for hard modeling object should be jetted on the contour line).

Moreover, when an active energy ray irradiator is disposed next to an inkjet head to jet the liquid material for soft modeling object, the fabrication speed is increased.

In addition, to smooth the fabricated layer, smoothing treatment is conducted immediately after curing treatment.

In the smoothing treatment, the surface of the cured film is smoothed by using a smoothing member such as a roller and a blade. For this reason, the precision per layer is improved, which leads to precise fabrication of the entire of a solid freeform fabrication object.

At this point, to shorten the lamination time and improve smoothness of the layer, the smoothing member is preferably disposed adjacent to an ultraviolet irradiator.

Figure 3:
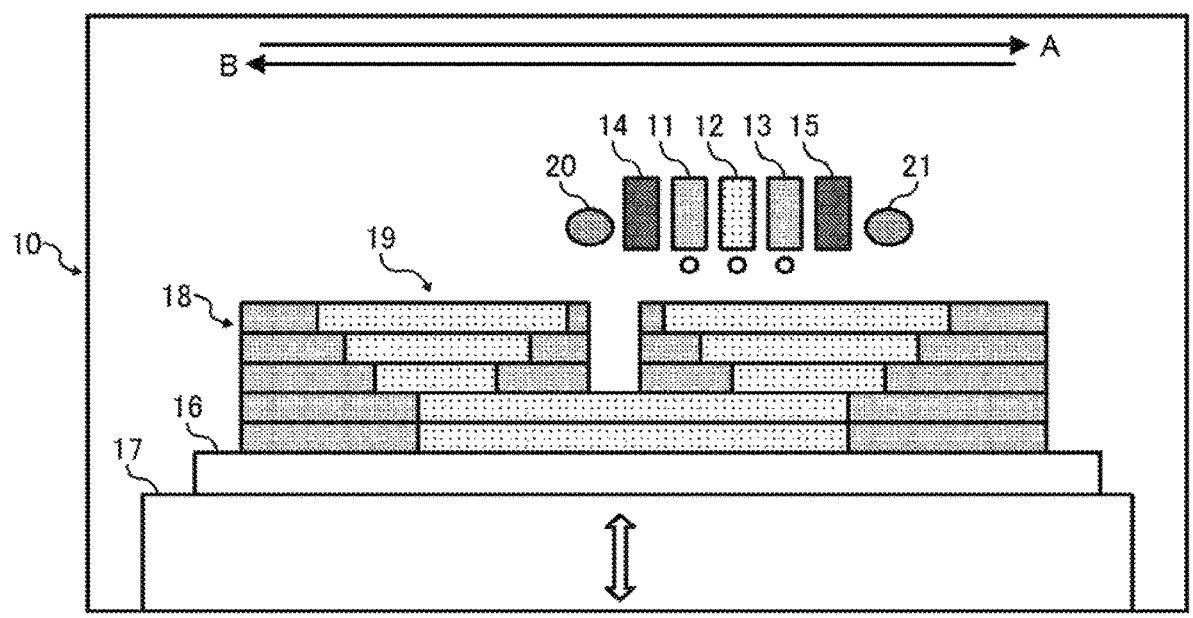
FIG. 3 is a schematic diagram illustrating an example of the device for manufacturing a solid freeform fabrication object according to an embodiment of the present disclosure.

FIG. 3 is a schematic diagram illustrating an example of the steps of manufacturing a solid freeform fabrication object according to the method of manufacturing a solid freeform fabrication object of the present disclosure using the device for manufacturing a solid freeform object of the present disclosure.

Using a head unit in which inkjet heads are arranged, a device 10 for manufacturing a solid freeform fabrication object jets a hydrogel liquid precursor from head units 11 and 12 to jet the liquid material for a solid freeform fabrication object and the liquid for forming a support from a head unit 13 to jet ink for support to laminate layers while curing the hydrogel liquid precursor by ultraviolet irradiators 14 and 15 placed next to the head units 11 and 13.

That is, the liquid for forming a support is jetted from an inkjet head (the head unit 13 to jet a liquid material for support) and solidified to form a first support layer having a pool. Thereafter, the hydrogel liquid precursor is jetted from the inkjet head (head units 11 and 12 to jet the liquid material for solid freeform fabrication object) to the pool of the first support layer. The film-formed hydrogel liquid precursor is irradiated with an active energy ray and cured. Thereafter, the cured film is smoothed by smoothing members 20 and 21 to form a first solid freeform fabrication object layer. This is sequentially repeated to manufacture a three-dimensional additive manufacturing object 19.

In addition, in the device 10, the ultraviolet ray irradiators 14 and 15 are used in both directions indicated by the arrows A and B. Due to heat generated upon irradiation of ultraviolet ray, the surface of the material for the laminated hard modeling object is smoothed, thereby improving the dimension stability of the fabrication object.

Furthermore, to keep the gap between the head units 11, 12, and 13 to jet a liquid material and the ultraviolet irradiators 14 and 15, a fabrication object 19, and a support 18 constant, a stage 17 is lowered according to the number of lamination.

Figure 4:
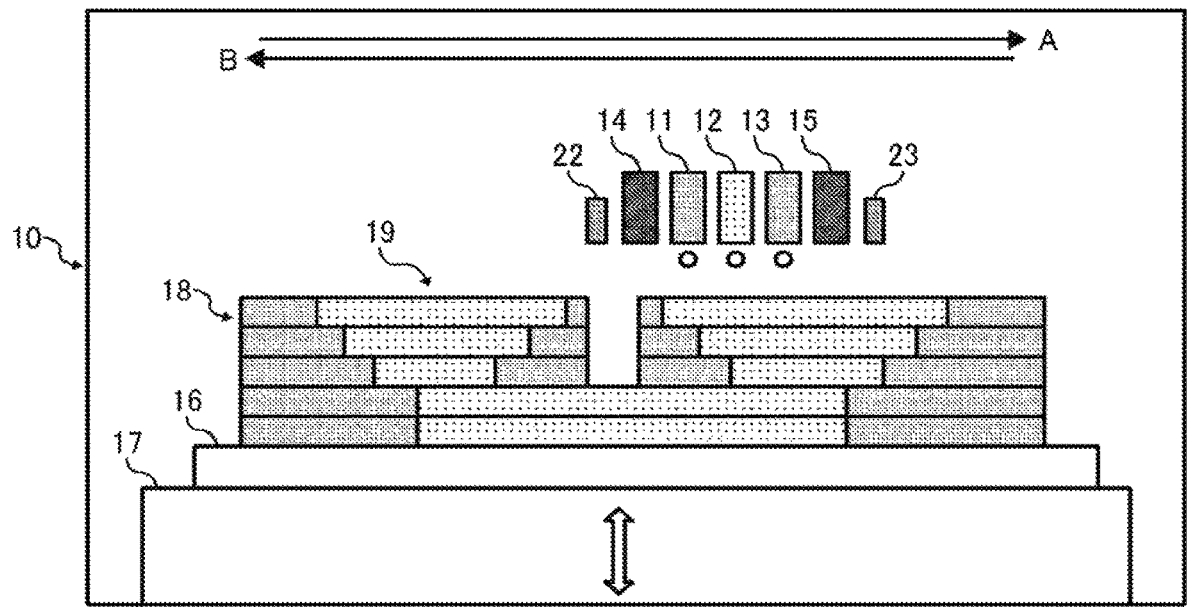
FIG. 4 is a schematic diagram illustrating another example of the device for manufacturing a solid freeform fabrication object according to an embodiment of the present disclosure.

FIG. 4 is a schematic diagram illustrating another example of the step of manufacturing a solid freeform fabrication object according to the method of manufacturing a solid freeform fabrication object of the present disclosure using the device for manufacturing a solid freeform object of the present disclosure. Specifically, the smoothing member illustrated in FIG. 3 is changed to a member having a blade-like form. This is more useful when the surface of a solid freeform fabrication subject is scraped off during smoothing than the member having a roller-like form illustrated in FIG. 3.

Figure 5:
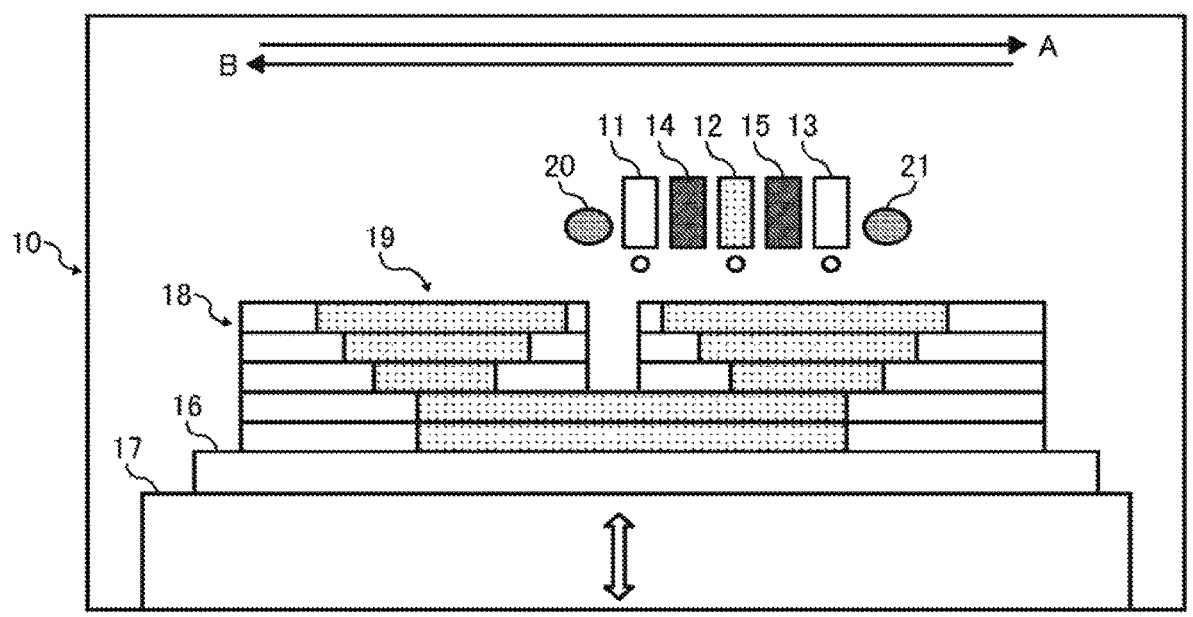
FIG. 5 is a schematic diagram illustrating yet another example of the device for manufacturing a solid freeform fabrication object according to an embodiment of the present disclosure.

FIG. 5 is a schematic diagram illustrating another example of the step of manufacturing a solid freeform fabrication object having a configuration to improve smoothness of each layer better than that illustrated in FIG. 3. The basic process is the same as in FIG. 3 but unlike the configuration illustrated in FIG. 3, the ultraviolet ray irradiator 14 are placed between the head unit 11 and the head unit 12 and the ultraviolet ray irradiator 15 are placed between the head unit 12 and the head unit 13.

In addition, in the device 10 employing this method, the ultraviolet irradiators 14 and 15 are used when moving in both directions indicated by the arrows A and B. Due to heat generated upon irradiation of ultraviolet ray, the surface of the liquid material for the laminated hard modeling object is smoothed, thereby the dimension stability of the solid freeform fabrication object is improved.

In addition, the device 10 may furthermore include devices for collecting liquid, maintaining, recycling, etc. Also, the device 10 optionally includes a blade to remove a liquid material attached to the nozzle surface and a detection mechanism to detect non-discharging nozzles. Moreover, it is preferable to control the environment temperature in the device for manufacturing a solid freeform fabrication during fabrication.

If a maintaining mechanism is provided, the liquid material for soft modeling object and the liquid material for hard modeling object are prevented from being hardened when collected by a liquid collecting mechanism.

Figure 6:
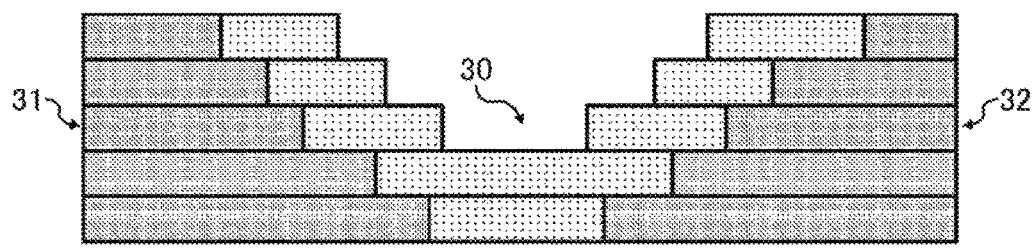
FIG. 6 is a schematic diagram illustrating an example of an intermediate substance (before peeling off from a support) manufactured according to the method of manufacturing a solid freeform fabrication object of an embodiment of the present disclosure.
Figure 7:
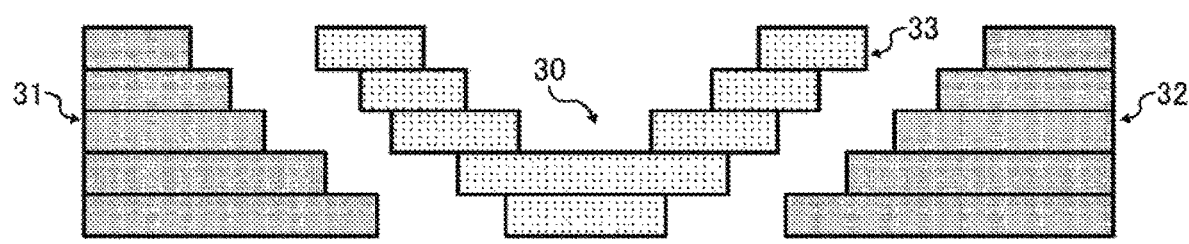
FIG. 7 is a diagram illustrating an example of the solid freeform fabrication object manufactured according to the method of manufacturing a solid freeform fabrication object of an embodiment of the present disclosure after peeled off.

The surface of the fabricated solid freeform fabrication object is physically peeled off from supports 31 and 32 as illustrated in FIG. 6 to obtain an additive manufacturing object as illustrated in FIG. 7.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

The 80 percent compressive stress-strain was measured by a universal tester (AG-I, manufactured by Shimadzu Corporation).

Example 1

Preparation of Hydrogel Liquid Precursor for Internal Organ

During stirring of 200 parts of pure water, 150 parts of synthesized hectorite (laponite XLG, manufactured by RockWood) having a composition of $[Mg_{5.34}Li_{0.66}Si_8O_{20}(OH)_4]Na^-_{0.66}$ as mineral was added little by little to the pure water. 0.8 parts of 1-hydroxyethane-1,1-diphosphonic acid was further added thereto to obtain a liquid dispersion by stirring.

Next, as a monomer, 20 parts of N,N-dimethylacrylamide (manufactured by Wako Pure Chemical Industries, Ltd.) which had passed through an active alumina column to remove a polymerization inhibitor and 1 part of PEG400# diacrylate (LITE ACRYLATE 9EG-A, manufactured by Kyoeisha Chemical Co., Ltd.) were added to the thus-obtained liquid dispersion. Next, while bathing the resultant in an ice bath, 15 parts of 2 percent by mass aqueous solution of peroxo sodium disulfate including 2 percent by mass peroxo sodium disulfate (manufactured by Wako Pure Chemical Industries, Ltd.) and 1 part of tetramethyl ethylene diamine (manufactured by wako Pure Chemical Industries, Ltd.) were added. Subsequent to stirring and mixing, the resultant was subject to degassing with a reduced pressure for 10 minutes. After filtration to remove impurities, a homogenized hydrogel liquid precursor for an internal organ was obtained.

Hydrogel Liquid Precursor for Blood Vessel 40 parts of red oil-soluble liquid dye in which 1 part of red oil-soluble dye (Sol.Red 18, manufactured by Chuo synthetic Chemical Co., Ltd.) was dissolved in 100 parts of salad oil (Nisshin Salad Oil, manufactured by The Nisshin OilliO Group, Ltd.) was added to 100 parts of a hydrogel liquid precursor for an internal organ and stirred by a homogenizer (HOMOMIXER MARK II, manufactured by PRIMIX Corporation) for about 30 seconds to obtain an emulsified hydrogel liquid precursor for blood vessel.

Manufacturing of Hydrogel Internal Organ Model

A mold to manufacture a blood vessel was manufactured based on 3D data of blood vessel. The hydrogel liquid precursor for blood vessel was poured into the manufactured mold. The mold was sealed with a lid and curing reaction was conducted at 25 degrees C. for six hours. Subsequent to the curing, a hydrogel having a blood vessel-like form was obtained by taking out from the mold.

Thereafter, the thus-obtained hydrogel having a blood vessel-like form was disposed inside a mold to form a liver, manufactured based on 3D data of the liver. The hydrogel liquid precursor for an internal organ was poured into the mold to form a liver. The mold was sealed with a lid and curing reaction was conducted at 25 degrees C. for six hours. Subsequent to the curing, a solid freeform fabrication object (internal organ model) having a liver-like form including blood vessels was obtained by taking out from the mold. The texture and usability of the thus-obtained internal organ model were extremely close to those of a real liver.

The thus-obtained internal organ model was cut open with a knife (FEATHER for Surgeon No. 10 mounted onto standard handle No. 3, both manufactured by FEATHER Safety Razor Co., Ltd.) and the blood vessel was chopped up on purpose. Oozing of liquid (artificial blood) colored in red from the hydrogel having a blood vessel-like form was visually confirmed.

Example 2

A solid freeform fabrication object (internal organ model) was obtained in the same manner as in Example 1 except that the content of synthesized hectorite in the hydrogel liquid precursor for blood vessel was changed from 15 to 20 parts. The texture and usability of the thus-obtained internal organ model were extremely close to those of a real liver.

When the blood vessel of the thus-obtained internal organ was chopped up in the same manner as in Example 1, oozing of liquid (artificial blood) from the hydrogel having a blood vessel-like form was visually confirmed.

Example 3

A solid freeform fabrication object (internal organ model) was obtained in the same manner as in Example 1 except that the content of the red oil-soluble liquid dye in the hydrogel liquid precursor for blood vessel was changed from 40 to 80 parts. The texture and usability of the thus-obtained internal organ model were extremely close to those of a real liver.

When the blood vessel of the thus-obtained internal organ was chopped up in the same manner as in Example 1, oozing of liquid (artificial blood) from the hydrogel having a blood vessel-like form was visually confirmed.

Example 4

The oil phase in the hydrogel liquid precursor for blood vessel was mixed with water in such a manner that urethane resin accounted for 15 percent by mass and dissolved in bathing at 60 degrees C. to obtain an aqueous solution of 15 percent by mass urethane resin. Thereafter, 80 mL of aqueous solution of 15 percent by mass urethane resin heated to 60 degrees C. was charged into a 200 mL beaker followed by stirring. Thereafter, 60 g of acetone was added at once to obtain a microcapsule including the polyurethane resin as the wall material with a volume average particle diameter of 0.6 μm.

A solid freeform fabrication object (internal organ model) was obtained in the same manner as in Example 1 except that the red oil-soluble liquid dye in the hydrogel liquid precursor for blood vessel was changed to the microcapsule. The texture and usability of the thus-obtained internal organ model were extremely close to those of a real liver.

When the blood vessel of the thus-obtained internal organ was chopped up in the same manner as in Example 1, oozing of liquid (artificial blood) from the hydrogel having a blood vessel-like form was visually confirmed.

Example 5

Preparation of Liquid for Forming Support

The following recipe was dispersed to obtain a homogenized mixture using a homogenizer (HG30, manufactured by Hitachi Koki Co., Ltd.) at 2,000 rotation per minute (rpm).

Urethane acrylate (Diabeam K6038, manufactured by Mitsubishi Rayon Co., Ltd.): 10 parts Polymerizable monomer (Neopentyl glycol hydroxy pivalic acid ester di(meth)acrylate, product name: KAYARAD MANDA, manufactured by Nippon Kayaku Co., Ltd.): 90 parts Polymerization initiator (1-hydroxycyclohexyl phenylketon (IRGACURE® 184, manufactured by BASF): 3 parts Coloring material (blue pigment, product name: Linol Blue 7400G, manufactured by TOYO INK CO., LTD.): 2 parts Total: 105 parts Thereafter, the mixture was filtered to remove impurities followed by vacuum degassing for ten minutes to obtain a homogenized liquid for forming a support.

The tanks communicating with the inkjet head (GEN4, manufactured by Ricoh Industry Company, Ltd.) of the device 10 for manufacturing a solid freeform fabrication object illustrated in FIG. 3 were separately filled with the hydrogel liquid precursor for internal organ, the hydrogel liquid precursor for blood vessel, and the liquid for forming a support. The hydrogel liquid precursor for internal organ, the hydrogel liquid precursor for blood vessel, and the liquid for forming a support were separately jetted from the inkjet head to form a film. The hydrogel liquid precursor for internal organ, the hydrogel liquid precursor for blood vessel, and the liquid for forming a support were jetted on different sites.

Next, using an ultraviolet irradiator (UV LED lamp, SubZeroLED 600, manufactured by Integration Technology Japan), the film was irradiated with 365 nm in a light amount of 400 mJ/cm$^2$) to be cured. The cured film was smoothed by rollers 20 and 21. This was repeated as inkjet film forming layer by layer to obtain a solid freeform fabrication object (internal organ model).

When the blood vessel of the thus-obtained internal organ was chopped up in the same manner as in Example 1, oozing of liquid (artificial blood) from the hydrogel having a blood vessel-like form was visually confirmed.

Comparative Example 1

Referring to Japanese Patent No. 5745155, gelled artificial blood of polyvinyl alcohol was prepared.

A solution of 10 parts of polyvinyl alcohol (degree of polymerization: 1,800, degree of saponification: 99 percent, 10 percent by mass), 10 parts of dimethyl sulfoxide, and 80 parts of pure water were charged in a beaker and stirred and dissolved for four hours while being heated at 100 degrees C. in an oil bath heater (BO400, manufactured by Yamato Scientific Co., Ltd.) to obtain a liquid mixture. A red aqueous coloring material was added to the thus-obtained liquid mixture in a ratio of 3 percent by mass followed by mixing for 40 seconds by a stirrer to obtain a liquid mixture for blood vessel.

The liquid mixture for blood was suctioned in a disposable dropper and placed in a refrigerator at −20 degrees C., left undone for 16 hours. After the resting, the dropper was taken out from the refrigerator and left still to room temperature to obtain a red-colored gel having a cylindrical blood vessel-like form.

A solid freeform fabrication object (internal organ model) was obtained in the same manner as in Example 1 except that the hydrogel having a blood vessel was changed to the red-colored gel having a cylindrical blood vessel-like form. The thus-obtained internal organ model was chopped up in the same manner as in Example 1 but no oozing of the artificial blood was visually confirmed.

TABLE 1

|  |  | Coloring material inclusion substance | 80 percent compressive stress-strain | | Oozing of artificial blood |
|---|---|---|---|---|---|
|  |  |  | Colored portion (blood vessel) | Colored portion (other than blood vessel) |  |
| Example | 1 | Oil phase | 0.65 | 0.82 | Yes |
|  | 2 | Oil phase | 0.73 | 1.02 | Yes |
|  | 3 | Oil phase | 0.43 | 0.82 | Yes |
|  | 4 | Microcapsule | 0.71 | 0.81 | Yes |
|  | 5 | Oil phase | 0.71 | 0.94 | Yes |
| Comparative Example | 1 | Oil phase | 0.8 | 0.82 | No |

The blood vessel of Example 2 was more flexible than the blood vessel of Example 1.

The amount of the dye oozing from the artificial blood vessel was larger in Example 3 than in Example 1.

In comparison with Example 1, finer blood vessels were disposed at arbitrary sites in Example 4 so that they were suitable for more real surgical operation training. In addition, the texture and usability of the thus-obtained internal organ model were extremely close to those of a real liver.

Embodiments of the present disclosure are, for example, as follows.

1. A solid freeform fabrication object including a hydrogel including a polymer, water, and a coloring material inclusion substance.

2. The solid freeform fabrication object according to 1 mentioned above, wherein the coloring material inclusion substance includes at least one of an oil phase and a microcapsule, each of which includes at least one coloring material.

3. The solid freeform fabrication object according to 2 mentioned above, wherein the coloring material includes at least one of an oil-soluble dye and oil-dispersible pigment.

4. The solid freeform fabrication object according to any one of 1 to 3 mentioned above, wherein the hydrogel further includes a mineral.

5. The solid freeform fabrication object according to any one of 1 to 4 mentioned above, wherein the polymer includes a water-soluble polymer.

6. The solid freeform fabrication object according to any one of 1 to 5 mentioned above, wherein the water accounts for 50 percent by mass or more of the solid freeform fabrication object.

7. The solid freeform fabrication object according to any one of 1 to 6 mentioned above, wherein the hydrogel includes multiple hydrogels having different compression stresses and at least one of the multiple hydrogels include the coloring material inclusion substance.

8. The solid freeform fabrication object according to any one of 1 to 7 mentioned above, wherein the coloring material inclusion substance has a volume average particle diameter of from 1 mm or less.

9. The powder material according to any one of 2 to 8 mentioned above, wherein the coloring material includes oil-soluble dye.

10. An internal organ model including the solid freeform fabrication object of any one of 1 to 9 mentioned above.

11. A method of manufacturing a solid freeform fabrication object including using a hydrogel liquid precursor including water, a monomer, and a coloring material inclusion substance to manufacture the solid freeform fabrication object including a hydrogel.

12. The method according to 11 mentioned above, further including injecting the hydrogel liquid precursor into a mold.

13. The solid freeform fabrication object according to 11 or 12 mentioned above, wherein the hydrogel liquid precursor further includes a mineral.

14. The method according to 13 described above, wherein the mineral includes a water swellable clay mineral.

15. The solid freeform fabrication object according to any one of 11 to 14 mentioned above, wherein the coloring material inclusion substance includes an oil phase and/or a microcapsule, each of which includes at least one coloring material.

16. A method of manufacturing a solid freeform fabrication object including applying a hydrogel liquid precursor including water, a monomer, and a coloring material inclusion substance to form a film, curing the formed film, and repeating the applying and the curing multiple times.

17. The method according to 16 mentioned above, wherein the monomer includes at least one of acrylamide, N,N-dimethyl acrylamide, and N-isopropyl acrylamide.

18. The method according to 16 or 17 mentioned above, wherein the hydrogel liquid precursor further includes a mineral.

19. The method according to 18 mentioned above, wherein the mineral includes a water swellable clay mineral.

20. The solid freeform fabrication object according to any one of 16 to 19 mentioned above, wherein the coloring material inclusion substance includes an oil phase and/or a microcapsule, each of which includes at least one coloring material.

According to the present disclosure, a solid freeform fabrication object can be provided which has textures and usabilities extremely close to real internal organs and is capable of oozing artificial blood when a blood vessel is cut Next, the present disclosure is described in detail with reference to Examples but is not limited thereto.

Having now fully described embodiments of the present invention, it will be apparent to one of ordinary skill in the art that many changes and modifications can be made thereto without departing from the spirit and scope of embodiments of the invention as set forth herein.

What is claimed is:

1. A solid freeform fabrication object comprising:
a hydrogel including a polymer, water, and a coloring material inclusion substance, wherein the coloring material inclusion substance includes at least one of an oil phase and a microcapsule, each of which includes at least one coloring material.

2. The solid freeform fabrication object according to claim 1, wherein the coloring material includes at least one of an oil-soluble dye and an oil-dispersible pigment.

3. The solid freeform fabrication object according to claim 1, wherein the hydrogel further includes a mineral.

4. The solid freeform fabrication object according to claim 1, wherein the polymer includes a water-soluble polymer.

5. The solid freeform fabrication object according to claim 1, wherein the water accounts for 50 percent by mass or more of the solid freeform fabrication object.

6. The solid freeform fabrication object according to claim 1, wherein the hydrogel includes multiple hydrogels having different compression stresses and at least one of the multiple hydrogels include the coloring material inclusion substance.

7. The solid freeform fabrication object according to claim 1, wherein the coloring material inclusion substance has a volume average particle diameter of from 1 mm or less.

8. An internal organ model comprising:
the solid freeform fabrication object of claim 1.

9. A method of manufacturing a solid freeform fabrication object comprising:
using a hydrogel liquid precursor including water, a monomer, and a coloring material inclusion substance, wherein the coloring material inclusion substance includes at least one of an oil phase and a microcapsule, each of which includes at least one coloring material; and
manufacturing the solid freeform fabrication object including a hydrogel.

10. The method according to claim 9, wherein the hydrogel liquid precursor further includes a mineral.

11. A method of manufacturing a solid freeform fabrication object comprising:
applying a hydrogel liquid precursor including water, a monomer, and a coloring material inclusion substance to form a film, wherein the coloring material inclusion substance includes at least one of an oil phase and a microcapsule, each of which includes at least one coloring material;
curing the film; and
repeating the applying and the curing.

12. The method according to claim 11, wherein the hydrogel liquid precursor further includes a mineral.

* * * * *